(12) United States Patent
Carlson et al.

(10) Patent No.: US 7,798,410 B2
(45) Date of Patent: Sep. 21, 2010

(54) HYBRID LASER SCANNING AND IMAGING READER

(75) Inventors: Bradley Carlson, Huntington, NY (US); Edward Barkan, Miller Place, NY (US); Vladimir Gurevich, Stony Brook, NY (US); Christopher Warren Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 459 days.

(21) Appl. No.: 11/823,817

(22) Filed: Jun. 28, 2007

(65) Prior Publication Data

US 2009/0001171 A1 Jan. 1, 2009

(51) Int. Cl.
*G06K 7/10* (2006.01)
(52) U.S. Cl. ............ 235/462.43; 235/459; 235/462.14; 235/462.32; 235/472.01; 235/486
(58) Field of Classification Search ..... 235/426.01–486
See application file for complete search history.

(56) References Cited

U.S. PATENT DOCUMENTS

| | | | | |
|---|---|---|---|---|
| 4,613,895 A | | 9/1986 | Burkey et al. | |
| 5,672,858 A | * | 9/1997 | Li et al. | 235/462.04 |
| 5,691,528 A | * | 11/1997 | Wyatt et al. | 235/462.07 |
| 5,703,349 A | | 12/1997 | Meyerson et al. | |
| 6,809,847 B2 | * | 10/2004 | McQueen | 235/462.36 |
| 7,546,948 B2 | * | 6/2009 | Maranov | 235/462.01 |
| 2005/0139678 A1 | * | 6/2005 | Helsel et al. | 235/462.37 |
| 2007/0051812 A1 | | 3/2007 | Lopez et al. | |

FOREIGN PATENT DOCUMENTS

WO WO 2006/023115 A1 3/2006

OTHER PUBLICATIONS

International Search Report and the Written Opinion of the International Searching Authority for International Application No. PCT/US2008/068802 mailed Sep. 15, 2008.

* cited by examiner

*Primary Examiner*—Thien Minh Le
*Assistant Examiner*—Christle I Marshall

(57) ABSTRACT

An imaging module is supported by a housing of a reader for electro-optically reading indicia. The imaging module includes a solid-state imager having an array of image sensors for capturing return light from the indicia during reading. A laser scanning module is also supported by the housing and includes a scanner for scanning at least one of a laser beam from a laser and a field of view of a light detector in a scan pattern across the indicia during reading. A controller is operatively connected to the modules, and is operative for preventing reading interference between the modules during reading.

44 Claims, 2 Drawing Sheets

HYBRID LASER SCANNING AND IMAGING READER

DESCRIPTION OF THE RELATED ART

Moving laser beam-based readers, in both handheld and hands-free modes of operation, have been used to electro-optically read coded symbols, particularly one-dimensional Universal Product Code (UPC) type symbols, in supermarkets, warehouse clubs, department stores, and other kinds of retailers for many years. A laser generates a laser beam directed to a symbol associated with a product for reflection and scattering from the symbol. A detector having a field of view detects light of variable intensity returning from the symbol. A scanner scans at least one of the laser beam and the field of view in a scan pattern comprised of one or more scan lines. When at least one of the scan lines sweeps over the symbol, an electrical signal indicative of the intensity of the detected return light is processed by signal processing circuitry including a microprocessor; the symbol is read; and the product is identified.

Imager-based readers, in both handheld and hands-free modes of operation, have also been used to electro-optically read targets such as coded symbols, particularly two-dimensional symbols, by employing solid-state imagers to capture an image of each symbol. The imager comprises an array of cells or photosensors, which correspond to image elements or pixels in a field of view of the imager. Such an array may be comprised of a one- or two-dimensional charge coupled device (CCD) or a complementary metal oxide semiconductor (CMOS) device, analogous to those devices used in a digital camera to capture images.

The imager-based reader further typically includes an illuminator to illuminate the symbol during its reading with illumination light emitted from an illumination light source and directed to the symbol for reflection therefrom. The illumination light source may be located within and/or externally of the reader, and comprises one or more light emitting diodes (LEDs). The imager-based reader yet further includes electronic circuitry for producing electrical signals indicative of the light captured by the array, and a microprocessor for processing the electrical signals to produce each captured image.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

In the hands-free mode of either the moving laser beam-based reader or the imager-based reader, an operator may slide or swipe the product bearing the symbol past a window of either reader, either from right to left, or from left to right, in a "swipe" mode. Alternatively, the operator may present the symbol on the product to an approximate central region of the respective window in a "presentation" mode. The choice depends on operator preference or on the layout of a workstation in which the reader is used.

In the handheld mode of either the moving laser beam-based reader or the imager-based reader, the operator holds the respective reader in his or her hand during reading and aims the reader at the symbol to be read. The operator may first lift the reader from a countertop or a support cradle. Once reading is completed, the operator may return the reader to the countertop or to the support cradle.

Although the moving laser beam-based reader and the imager-based reader are generally satisfactory for their intended purposes, their capabilities are limited in certain respects. The moving laser beam-based reader works well in the handheld mode when reading one-dimensional symbols, but does not read certain two-dimensional symbols as well as the imager-based reader can, and cannot read other two-dimensional symbols at all. Sometimes, the moving laser beam-based reader is too big and bulky to pick up and aim at a symbol easily. The imager-based reader, on the other hand, works well in the hands-free mode for reading one- and two-dimensional symbols, but it works poorly in the handheld mode primarily due to its housing design, which fails ergonomically in several ways.

Specifically, a housing of a known imager-based reader is designed to be gripped between an operator's thumb, on one side of the housing, and the operator's fingertips on the other side of the housing, when picked up for handheld reading. This is an uncomfortable grip. Also, reading of the known imager-based reader is initiated by pressing one of two switches on a side of the housing. The operator is required to press one of the switches before aiming the reader at a symbol, and to release the button to initiate image capture. When the button is pressed, an aiming spot of light is projected on the symbol to facilitate aiming. When the aiming spot is on the symbol, the switch is released, and the reader decodes and reads the symbol. The aiming spot turns off when the switch is released. If the switch is not pressed before aiming the reader at a symbol, the reader will scan the symbol automatically; however, this leaves open the possibility of accidentally reading the wrong symbol as the reader is moved towards the desired symbol to be read. Accidental reads waste time and open the possibility of erroneously charging customers at point-of-sale workstations, or of inaccurately recording scanned inventory information, etc.

Another problem with the known imager-based readers is that the aiming spot only indicates where a center of the imager's field of view is. It does not give any visual indication of where the edges of the field of view are. This is a significant handicap when reading wide symbols, and particularly when reading the two-dimensional symbols on the back of driver's licenses in most states of the United States. To read easily, these two-dimensional symbols must be positioned close to the reader where the field of view of the imager extends only slightly beyond the ends of the symbol. If the symbol is held further away, the imager does not have adequate resolution to read some symbols and, if the symbol is held closer, then the field of view will not cover the entire symbol, thereby rendering the symbol unreadable. The known imager-based reader provides no visual guidance to the operator that helps the operator determine at what distance to hold the symbol. Hence, the operator typically ends up waving the symbol around until the right distance is finally found, at which time the reader beeps to indicate that the symbol has been decoded. This is a slow process and not acceptable for busy scanning environments.

Another problem that the known imager-based reader fails to address is that, when used in the hands-free mode, the reader needs to have a somewhat limited working range (around six to eight inches), or the reader will accidentally scan products that customers place on the counter-top nearby. However, when used in the handheld mode, the reader is better off with a greater working range, which makes it easier to scan symbols on products that are too big, heavy, or bulky to move close up to the reader.

SUMMARY OF THE INVENTION

One feature of the present invention resides, briefly stated, in a reader for, and a method of, electro-optically reading indicia, especially one- and/or two-dimensional symbols. Each symbol includes elements of different light reflectivity, e.g., bars and spaces. The reader could be configured, in one embodiment, as a hands-free and/or a hand-held housing having a window. The housing may have a handle for handheld operation and/or a base for supporting the housing on a support surface for hands-free operation. Preferably, the base is connected to the housing in both the handheld and hands-free modes by being pivotably connected to the handle. Also, the housing is preferably configured with a gun-shaped configuration, and a manually actuatable trigger is provided on the housing at a location underlying an operator's forefinger when the operator holds the handle in the operator's hand. In another embodiment, the reader could be configured as a stationary bi-optic housing having dual windows.

In some applications, each window could be omitted, in which event, the reader has a windowless opening at which the indicia are located for reading. As used herein, the term "presentation area" is intended to cover both a window and a windowless opening. In the case of the hands-free reader, the symbol is swiped past, or presented to, the presentation area and, in the case of the handheld reader, the reader itself is moved and the presentation area is aimed at the symbol. In the preferred embodiments, the reader is installed in a retail establishment, such as a supermarket, especially in a cramped environment.

An imaging module is supported by the housing, and includes a one- or two-dimensional, solid-state imager mounted in the reader. The imager has an array of image sensors operative, together with a focusing lens assembly, for capturing light from a one- or two-dimensional symbol or target through the presentation area during the reading to produce a captured image. Preferably, the array is a CCD or a CMOS array. When the reader is operated in low light or dark ambient environments, the imaging module includes an illuminator for illuminating the symbol during the reading with illumination light directed from an illumination light source through the presentation area. The illumination light source comprises one or more light emitting diodes (LEDs).

A laser scanning module is also supported by the housing and includes a scanner for scanning at least one of a laser beam from a laser and a field of view of a light detector in a scan pattern, typically comprised of one or more scan lines, across the indicia during reading. The laser scanning module may also include signal processing circuitry for processing an electrical analog signal generated by the light detector, and a digitizer for converting the analog signal to a digital signal for subsequent decoding.

In accordance with one aspect of this invention, a controller, especially but not necessarily operative for decoding the digital signal, is operatively connected to the modules, for preventing reading interference between the modules during reading. For example, a mode sensor is employed for detecting the mode of operation; and the controller enables the laser scanning module to read the indicia when the mode sensor detects the handheld mode, and enables the imaging module to read the indicia when the mode sensor detects the hands-free mode. The mode sensor is operative for detecting the mode of operation by sensing one of motion, position and orientation of the housing.

As another example, the controller enables the imaging module to capture the return light during an exposure time of a frame, and downloads data generated by the imager during a read-out time of the frame; and the controller enables the laser scanning module to scan the indicia during the read-out time to prevent reading interference with the imaging module.

As still another example, the controller energizes the illuminator for illuminating the indicia during reading with the illumination light directed from the illuminating light source during the exposure time, and the controller disables the illuminating light source during the read-out time to prevent reading interference between the modules.

As yet another example, the illumination light and the laser beam have different frequencies to prevent reading interference between the modules.

Additionally, the controller advantageously turns the laser beam off during scanning, for example, at the end regions of the scan lines; and the controller enables the imaging module to capture the return light when the laser beam is turned off, again to prevent reading interference with the laser scanning module.

The housing may be configured to block the laser beam during scanning, for example, at the end regions of the scan lines. In that case, the controller enables the imaging module to capture the return light when the laser beam is blocked to prevent reading interference with the laser scanning module.

Another example resides in operating the scanner to sweep through a scan angle larger than a field of view of the imager. The controller enables the imaging module to capture the return light when the laser beam is outside the field of view of the imager to prevent reading interference between the modules.

In accordance with another aspect of the invention, the controller is operative for distinguishing between types of the indicia, e.g., one- or two-dimensional symbols, and for enabling one of the modules to read the indicia of one determined type, and for enabling another of the modules to read the indicia of another determined type. For example, the laser scanning module is especially good at reading one-dimensional symbols, and the imaging module is especially good at reading two-dimensional symbols.

In accordance with still another aspect of the invention, the controller is operative for distinguishing between working distances at which the indicia are located relative to the reader, and for enabling one of the modules to read the indicia at working distances close to the reader, and for enabling another of the modules to read the indicia at working distances further from the reader. For example, the laser scanning module is especially good at reading symbols that are further away from the reader due to its large depth of field, and the imaging module is especially good at reading symbols that are closer to the reader due to its smaller depth of field. This increases the range of the reader.

In accordance with yet another aspect of the invention, the controller is operative for enabling the laser scanning module to scan the laser beam over the indicia prior to reading to facilitate aiming of the reader at the indicia, and for enabling one of the modules to read the indicia after aiming. In other words, the laser scanning module not only performs its reading function, but also assists the imaging module by performing an aiming function. The scan pattern is visible on the symbol.

A secondary aiming light projector may be employed in the imaging module to project a pattern of light that visibly indicates to the operator where the periphery of the field of view of the imager is. For example, the aiming light projector might project an aiming pattern of light shaped like a cross, which consists of a vertical line that matches the vertical dimensions of the field of view, and also a horizontal line whose ends match the horizontal width of the field of view. This projected aiming pattern should grow at the same angular rate as the scan pattern so that it properly indicates the extent of the field of view at any distance from the reader. This aiming light pattern can be created using either LED light or laser light. The aiming light projector makes it easy to scan difficult to read driver's licenses by clearly indicating to the operator where the periphery of the field of view of the imager is, so as to facilitate fitting the driver's license symbol entirely within the field of view.

In the preferred embodiment, a horizontal line of the aiming pattern can be created by a scanned laser line projected from the laser scanning module. The scan angle of the scanned laser beam is adjusted to match the divergence angle of the field of view of the imager so that the ends of the visible scan line is a visible indication of the ends of the imager's field of view. The operator can now use the laser scan line as a guide to properly position a symbol in front of the imager, for subsequent decoding. The symbol can also be decoded by the laser scanning module if both modules are enabled to read at the same time. In some cases, the operator may need to be able to selectively read a symbol that is positioned close to other symbols, for example, in a barcode menu list. The scan angle of the laser scanning module is adjustable to be reduced to a short line to facilitate aiming in these applications.

The invention still further resides in a method of electro-optically reading indicia, by supporting an imaging module by a housing, and capturing return light from the indicia by the imaging module during reading with a solid-state imager having an array of image sensors; by supporting a laser scanning module by the housing, and scanning at least one of a laser beam from a laser and a field of view of a light detector in a scan pattern across the indicia by the laser scanning module during reading; and by preventing reading interference between the modules during reading.

The reading interference is prevented in various ways. For example, the imaging module is enabled to capture the return light during an exposure time of a frame, and data generated by the imager is downloaded during a read-out time of the frame. The laser scanning module is enabled to scan the indicia during the read-out time to prevent reading interference with the imaging module. Also, the imaging module illuminates the indicia during reading with the illumination light during the exposure time, and the illuminating light is disabled during the read-out time to prevent reading interference between the modules. The illumination light and the laser beam are advantageously selected to have different frequencies to prevent reading interference between the modules. The laser beam is turned off during scanning; and the return light is captured when the laser beam is turned off, again to prevent reading interference with the laser scanning module. The laser beam is blocked during scanning; and the return light is captured when the laser beam is blocked to prevent reading interference with the laser scanning module. The laser beam is swept through a scan angle larger than a field of view of the imager, and the return light is captured when the laser beam is outside the field of view of the imager to prevent reading interference between the modules.

The invention yet further resides in a method of electro-optically reading indicia, comprising the steps of holding a housing by a handle held by an operator in a handheld mode of operation, and supporting the housing by a base on a support surface during a hands-free mode of operation; supporting an imaging module by the housing, and capturing return light from the indicia during reading with a solid-state imager having an array of image sensors; supporting a laser scanning module by the housing, and scanning at least one of a laser beam from a laser and a field of view of a light detector in a scan pattern across the indicia during reading; detecting the mode of operation; and enabling the laser scanning module to read the indicia when the handheld mode is detected, and enabling the imaging module to read the indicia when the hands-free mode is detected.

The invention additionally resides in a method of electro-optically reading indicia, comprising the steps of: supporting an imaging module by a housing, and capturing return light from the indicia during reading with a solid-state imager having an array of image sensors; supporting a laser scanning module by the housing, and scanning at least one of a laser beam from a laser and a field of view of a light detector in a scan pattern across the indicia during reading; and distinguishing between types of the indicia, and enabling one of the modules to read the indicia of one determined type, and enabling another of the modules to read the indicia of another determined type.

The invention also resides in a method of electro-optically reading indicia located in a range of working distances from the reader, comprising the steps of: supporting an imaging module by a housing, and capturing return light from the indicia during reading with a solid-state imager having an array of image sensors; supporting a laser scanning module by the housing, and scanning at least one of a laser beam from a laser and a field of view of a light detector in a scan pattern across the indicia during reading; and distinguishing between the working distances of the indicia, and enabling one of the modules to read the indicia at working distances close to the reader, and enabling another of the modules to read the indicia at working distances further from the reader.

The invention additionally resides in a method of electro-optically reading indicia, comprising the steps of: supporting an imaging module by a housing, and capturing return light from the indicia with a solid-state imager having an array of image sensor; supporting a laser scanning module by the housing, and scanning a laser beam in a visible scan pattern across the indicia; and enabling the laser scanning module to scan the laser beam over the indicia prior to reading to facilitate aiming of the reader at the indicia, and enabling one of the modules to read the indicia after aiming.

Hence, this invention proposes a hybrid, dual module, reader that can be used as a presentation or swipe reader for hands-free reading of one- or two-dimensional symbols, and also offers excellent and intuitive "aim-and-shoot" ergonomics for handheld reading of one- or two-dimensional symbols by providing a gun-shaped housing having a trigger to be depressed by the operator's forefinger. The reader gives a clear visual indication of the extent of its field of view, to facilitate reading of wide targets like driver's licenses and two-dimensional symbols in either the hands-free or handheld mode. In addition, the working distance range increases in the handheld mode as compared to the hands-free mode.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
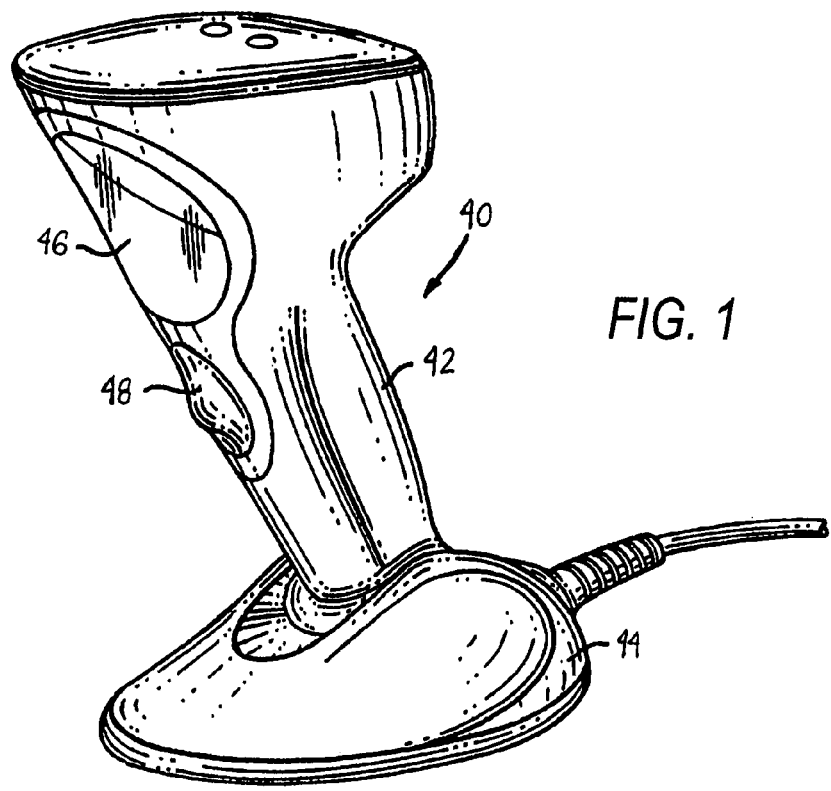
FIG. 1 is a perspective view of an electro-optical reader operative in either a hand-held mode, or a hands-free mode, for reading indicia in accordance with this invention.
Figure 2:
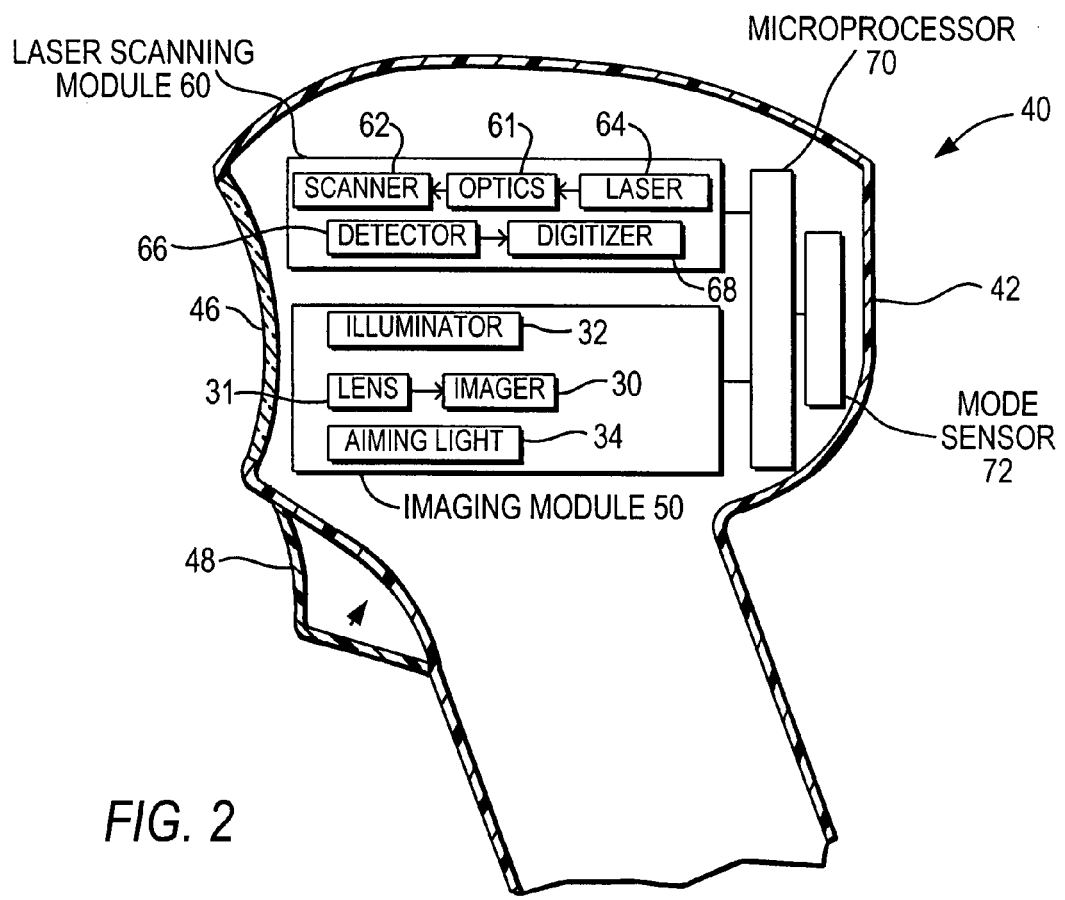
FIG. 2 is a broken-away, sectional view of the reader of FIG. 1 schematically depicting various components therein.

Reference numeral 40 in FIG. 1 generally identifies an electro-optical, portable reader having a gun-shaped housing 42 connected to a base 44. The base 44 rests on a countertop or analogous support surface and serves for supporting the reader 40. The reader 40 can thus be used in a hands-free mode as a stationary workstation in which products bearing indicia, such as one- or two-dimensional symbols, are presented to, or slid or swiped past, a presentation area or window 46. The gun-shaped housing 42 also has a handle that can be picked up by an operator off the countertop and held in the operator's hand in a handheld mode. A trigger 48 is located on the gun-shaped housing 42 at a location underlying an operator's forefinger when the operator holds the handle in the operator's hand in the handheld mode. The trigger 48 is manually depressed to initiate reading of the symbol. The handle is permanently and pivotably connected to the base 44 in both the handheld and hands-free modes for pivoting movement about a generally horizontal pivot axis that is generally parallel to, and elevated above, the countertop. The housing is adjustably tiltable forward and back about the pivot axis in the hands-free mode to aim the window 46 at the symbol to be read.

An imaging module 50 is supported by the housing 42, and includes a one- or two-dimensional, solid-state imager 30 mounted in the reader. The imager 30 has an array of image sensors operative, together with a focusing lens assembly 31, for capturing light from a one- or two-dimensional symbol or target through the presentation area 46 during the reading to produce an electrical signal indicative of a captured image for subsequent decoding. Preferably, the array is a CCD or a CMOS array. When the reader 40 is operated in low light or dark ambient environments, the imaging module 50 includes an illuminator 32 for illuminating the symbol during the reading with illumination light directed from an illumination light source through the presentation area 46. The illumination light source comprises one or more light emitting diodes (LEDs). An aiming light generator 34 may also be provided for projecting an aiming light pattern or mark on the symbol prior to reading.

In operation of the imaging module 50, a controller 70, as described below, sends a command signal to pulse the illuminator LEDs 32 for a short time period, say 500 microseconds or less, and energizes the imager 40 during an exposure time period of a frame to collect light from a target symbol during said time period. A typical array needs about 33 milliseconds to read the entire target image and operates at a frame rate of about 30 frames per second. The array may have on the order of one million addressable image sensors.

A laser scanning module 60 is also supported by the housing 42 and includes a scanner 62 for scanning at least one of a laser beam from a laser 64 and a field of view of a light detector 66 in a scan pattern, typically comprised of one or more scan lines, across the indicia during reading. The laser scanning module 60 may also include optics 61 for focusing the laser beam to have a large depth of field, and a digitizer 68 for converting an electrical analog signal generated by the detector 66 into a digital signal for subsequent decoding.

In operation of the laser scanning module 60, the controller 70, as described below, energizes the laser to emit the laser beam, and energizes the scanner to sweep the laser beam in the scan pattern. The controller 70 also processes the digitized signal from the digitizer 68.

In accordance with one aspect of this invention, a programmed microprocessor or controller 70, especially but not necessarily operative for decoding the digital signal from the digitizer 68 or the electrical signal indicative of the captured image from the imager 30, is operatively connected to the modules 50, 60 for preventing reading interference between the modules during reading. For example, a mode sensor 72 is employed for detecting the mode of operation; and the controller 70 enables the laser scanning module 60 to read the indicia when the mode sensor 72 detects the handheld mode, and enables the imaging module 50 to read the indicia when the mode sensor 72 detects the hands-free mode. The mode sensor 72 is operative for detecting the mode of operation by sensing one of motion, position and orientation of the housing 42. For example, the mode sensor 72 can detect when the reader 40 is lifted by means of a switch mounted on an underside of the base 44, the switch being pushed in when the reader is on a support surface, and the switch being released and moved outwards when the reader 40 is lifted. The mode sensor 72 can also be an orientation sensor or tilt switch for detecting whether or not the reader is in a predetermined orientation. The mode sensor 72 can also be an accelerometer for detecting motion when the reader is lifted, or lack of motion when the reader is on the support surface, thereby causing the reader to automatically switch between modes.

As another example of preventing reader interference, the controller 70 enables the imaging module 50 to capture the return light during an exposure time of a frame, and downloads data generated by the imager 30 during a read-out time of the frame; and the controller 70 enables the laser scanning module 60 to scan the indicia during the read-out time to prevent reading interference with the imaging module 50.

As still another example, the controller 70 energizes the illuminator 32 for illuminating the indicia during reading with the illumination light directed from the illuminating light source during the exposure time, and the controller 70 disables the illuminating light source during the read-out time to prevent reading interference between the modules 50, 60.

As yet another example, the illumination light and the laser beam have different frequencies to prevent reading interference between the modules 50, 60.

Additionally, the controller 70 advantageously turns the laser beam off during scanning, for example, at the end regions of the scan lines; and the controller 70 enables the imaging module 50 to capture the return light when the laser beam is turned off, again to prevent reading interference with the laser scanning module 60.

The housing 42 may be configured to block the laser beam during scanning, for example, at the end regions of the scan lines. In that case, the controller 70 enables the imaging module 50 to capture the return light when the laser beam is blocked to prevent reading interference with the laser scanning module 60.

Another example resides in operating the scanner 62 to sweep through a scan angle larger than a field of view of the imager 30. The controller 70 enables the imaging module 50 to capture the return light when the laser beam is outside the field of view of the imager 30 to prevent reading interference between the modules 50, 60.

In accordance with another aspect of the invention, the controller 70 is operative for distinguishing between types of the indicia, e.g., one- or two-dimensional symbols, and for enabling one of the modules to read the indicia of one determined type, and for enabling another of the modules to read the indicia of another determined type. For example, the laser scanning module 60 is especially good at reading one-dimensional symbols, and the imaging module 50 is especially good at reading two-dimensional symbols.

In accordance with still another aspect of the invention, the controller 70 is operative for distinguishing between working distances at which the indicia are located relative to the reader 40, and for enabling one of the modules to read the indicia at working distances close to the reader, and for enabling another of the modules to read the indicia at working distances further from the reader. For example, the laser scanning module 60 is especially good at reading symbols that are further away from the reader 40 due to its large depth of field, and the imaging module 50 is especially good at reading symbols that are closer to the reader due to its smaller depth of field. This increases the range of the reader.

In accordance with yet another aspect of the invention, the controller 70 is operative for enabling the laser scanning module 60 to scan the laser beam over the indicia prior to reading to facilitate aiming of the reader 40 at the indicia, and for enabling one of the modules to read the indicia after aiming. In other words, the laser scanning module 60 not only performs its reading function, but also assists the imaging module 50 by performing an aiming function. The scan pattern is visible on the symbol.

Figure 3:
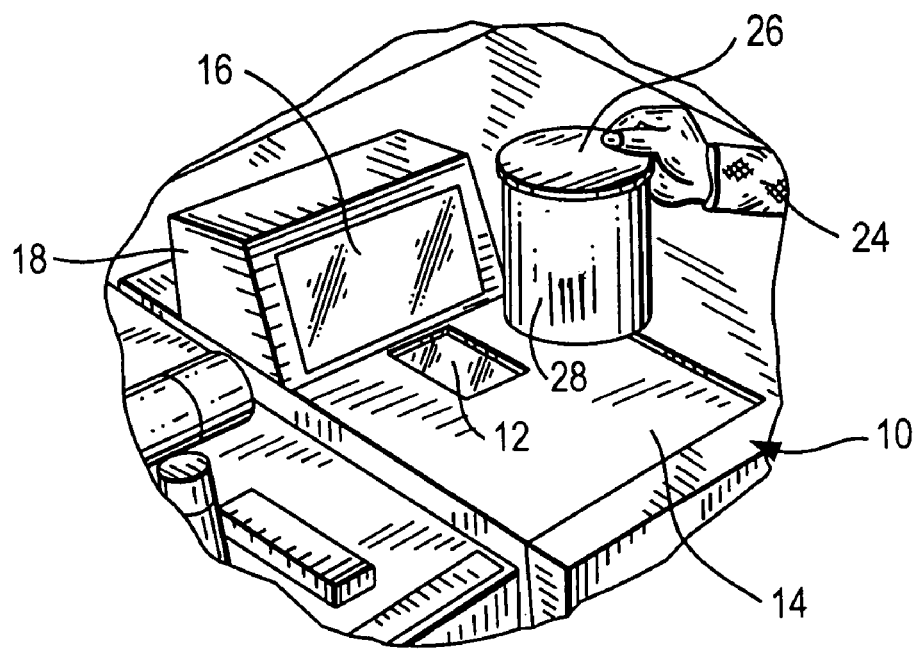
FIG. 3 is a perspective view of a bi-optical reader operative for reading indicia in accordance with this invention.

FIG. 3 depicts a dual window, bi-optic, point-of-transaction workstation or housing 10 used by retailers to process transactions involving the purchase of products bearing an identifying symbol, typically the UPC symbol described above. Housing 10 has a generally horizontal window 12 set flush into a countertop 14, and an upright window 16 set flush, or recessed, into a raised housing portion 18 above the countertop 14. An operator 24 is shown holding a product 26 bearing a symbol 28.

Figure 4:
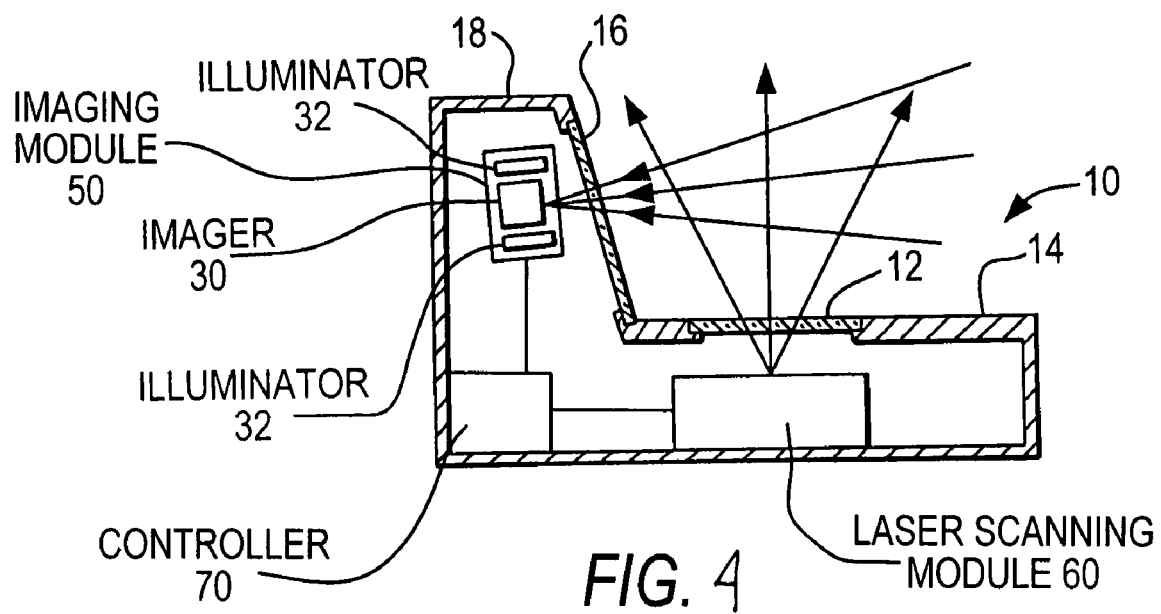
FIG. 4 is a broken-away, sectional view of the reader of FIG. 3 schematically depicting various components therein.

As shown in FIG. 4, the imaging module 50 including the imager 30 and the illuminator 32 is mounted in the bi-optic housing 10. The laser scanning module 60 is also mounted in the bi-optic housing 10. The modules 50, 60 could be dedicated to individual windows as illustrated, or could share one or both of the windows 12, 16. The modules 50, 60 are operatively connected to the controller 70 operative, as described above, for controlling the operation of these modules. Preferably, the controller 70 is the same as the one used for decoding light scattered from the indicia and for processing and analyzing the captured target images.

Reading interference between the integrated laser scanning and imaging modules is prevented in various ways. For example, the imager 30 may have a short exposure time in a frame that is typically about 25% or less of the frame read-out time. In the next generation pico-imager in which a sixty frames per second frame rate is employed, the frame read-out time is a minimum of about 16.67 ms and the exposure time is about 4 ms. Since this imager 30 has a global electronic shutter, return light is only captured during the exposure time. Therefore, when the imager 30 is reading out data but not exposing, the laser scanning module 60 can operate without interfering with the imager module operation. Also, the imager illuminator 32 is not switched on during this time, so it does not interfere with the operation of the laser scanning module 60. The laser scanning module 60 can operate at a duty cycle of at least about 75% and therefore there is very little impact on the reader performance. If the exposure time of the imager 30 is short enough, the two modules appear to operate concurrently. If the exposure time is made very short (tenths of a millisecond), the operation of the reader is practically not interrupted.

Another approach for multiplexing the laser scanning and imaging modules is to use different wavelengths for the laser beam and the illumination light, and to use optical filters in the collection optics of each module to collect only the light dedicated for each module. For example, the illumination light could use a deeper red, blue, green or near infrared source, while the laser beam could use a different red source.

Another approach would be to let the laser scanning module continue operating, but ignore the pixels in the two-dimensional image captured by the imaging module that are exposed to the laser light.

Some laser scanning modules turn off the laser 64 near end regions of each scan line, where the scanner 62 slows down and reverses direction. If such a laser scanning module is used in conjunction with an imaging module, then the modules can be synchronized so that the illuminator 32 and the exposure time of the imager 30 is activated during this laser-off time period when the laser scanning module is not capturing symbol data. This synchronization enables the two modules to operate without interfering with each other at all. If the laser scanning module provides an output start-of-scan (SOS) signal which indicates when the scanner is at an end region of each scan line, then this SOS signal can be used to synchronize the modules.

Many laser scanning modules employ an automatic gain control (AGC) circuit whose behavior could be corrupted by the bright flash of the illuminator LEDs 32 used by the imaging module. This could degrade the performance of the laser scanning module. This problem can be eliminated by disabling the AGC whenever the LEDs 42 are flashed.

Some laser scanning modules do not turn off the laser 64 at the end regions of each scan line. Even when this kind of laser scanning module is used, it is still advantageous to synchronize the imaging module with the SOS signal so as to flash the LEDs 32 and capture an image only when the laser beam is at or near one end region of the scan line, since the laser does not scan well where the laser beam slows down before reversing direction. The housing of the reader can be designed to block the end region of each scan line where the laser beam will be during the LEDs 32 flash, so that operators do not attempt to place a symbol at the end of the scan line where the reader may not read.

Another approach would be to design the laser scanning and imaging modules such that the scan angle of the scanning laser beam is larger than the field of view of the imager 30. The imager 30 can be synchronized to expose the image when the laser beam is outside of the field of view of the imager 30, thereby eliminating the interference between the modules. Similar to the description above, the AGC of the laser scanning module can be disabled during the illuminator 32 flash to eliminate the interference between the modules.

As mentioned above, the LEDs 32 illuminate any symbol or object placed in front of the reader. The secondary aiming light projector 34 projects a pattern of light that visibly indicates to the operator 24 where the periphery of the field of view of the imager 30 is. For example, the aiming light projector 34 might project an aiming pattern of light shaped like a cross, which consists of a vertical line that matches the vertical dimensions of the field of view, and also a horizontal line whose ends match the horizontal width of the field of view. This projected aiming pattern should grow at the same angular rate as the scan pattern so that it properly indicates the extent of the field of view at any distance from the reader. This aiming light pattern can be created using either LED light or laser light. The aiming light projector 34 makes it easy to scan difficult to read driver's licenses by clearly indicating to the operator where the periphery of the field of view of the imager 30 is, so as to facilitate fitting the driver's license symbol entirely within the field of view.

In the preferred embodiment, a horizontal line of the aiming pattern can be created by a scanned laser line projected from the laser scanning module 60. The scan angle of the scanned laser beam is adjusted to match the divergence angle of the field of view of the imager 30 so that the ends of the visible scan line is a visible indication of the ends of the imager's field of view. The operator can now use the laser scan line as a guide to properly position a symbol in front of the imager 30, for subsequent decoding. The symbol can also be decoded by the laser scanning module if both modules are enabled to read at the same time. In some cases, the operator may need to be able to selectively read a symbol that is positioned close to other symbols, for example, in a barcode menu list. The scan angle of the laser scanning module is adjustable to be reduced to a short line to facilitate aiming in these applications.

In the hands-free mode, the imaging module becomes the primary reading module. An aiming pattern is not needed when scanning one-dimensional symbols, which is the most common application for this kind of reader, so that the laser 64 can be turned off most of the time. If a two-dimensional symbol is detected in front of the reader, then the laser 64 can be turned on to help the operator align the two-dimensional symbol to the field of view. After the two-dimensional symbol has been decoded, the laser 64 will turn off automatically until the next two-dimensional symbol is detected by the imager. Hence, the imager 30 is the primary means of decoding symbols when in the hands-free mode, and the laser 64 is used as an aiming guide. The secondary aiming projector 34 other than the scanning laser 64 can be used to augment a single scan line generated by the laser scanning module.

In the handheld mode, the laser scanning module becomes the primary reading module, and one-dimensional symbols represent the majority of symbols to be read. Occasionally, the operator may want to read a two-dimensional symbol, such as printed on a driver's license. The operator can aim the reader at the two-dimensional symbol, and the laser scanning module can recognize that it is looking at a two-dimensional symbol by the unique start/stop characters of the two-dimensional symbol, or by the structure of the internal characters. When this happens, the imaging module will be enabled to read the two-dimensional symbol, while the laser scan line may continue to be used to aim the reader to position the two-dimensional symbol within the field of view of the imager, as described above.

In some cases, it might be desirable to have both modules active at the same time. For example, in the handheld mode, the laser scanning module will provide an extra range of working distances, which is useful when reading one-dimensional symbols at a distance, but the imager could be used to read one-dimensional symbols omnidirectionally closer to the reader. The reader can therefore be user-programmable to have either the laser scanning module, or the imaging module, or both operational at the same time, or exclusively, in either the hands-free or handheld mode, or to have one module enable the other module, when necessary, as described above. User-programmability can be via scanning special command symbols with either reader, or by communication with a host.

An alternative embodiment would be to use a linear imager in place of the laser scanning module. In this case, the linear illumination line of the linear imager would take the place of the laser scan line for aiming. Switching between the linear imager and area imager would be accomplished in the same ways, as described above.

Another way to achieve similar results would be to use the area imager to simulate a single line scanner when in handheld mode. This can be accomplished by projecting a horizontal line of LED light near the center of the field of view of the area imager, and only using a central line or several central lines of the area imager to decode with. This eliminates the need for a secondary optical system for a linear imager or laser scanner, but does not provide the added range of a laser or linear imager when in handheld mode.

This invention enables, for the first time, a reader that provides excellent scanning ergonomics in both hands-free and handheld modes, and also provides optimum reading performance in both modes. The scan angle of the laser scanning module is advantageously matched to the field of view angle of the imager. Switching between the modules depends on the mode being used, what kind of symbology is being read, the working distance to the symbol, or by being user-programmed to enable whichever module is needed in either the handheld or hands-free mode.

Another improvement in the alternate modes of hands-free scanning vs. "point and shoot" handheld scanning is to have longer exposure time goals for the handheld mode. In the hands-free mode, a short exposure time allows good tolerance of motion in the presented symbol, and also limits the working distance range by limiting the amount of illumination. In the handheld mode, the reader can have a longer exposure as the symbol is not being swiped, thereby allowing for significantly more working range.

It will be understood that each of the elements described above, or two or more together, also may find a useful application in other types of constructions differing from the types described above. Thus, readers having different configurations can be used.

While the invention has been illustrated and described as integrating a laser scanning module and an imaging module in a hybrid reader and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
   a housing;
   an imaging module supported by the housing and including a solid-state imager having an array of image sensors for capturing return light from the indicia during reading;
   a laser scanning module supported by the housing and including a scanner for scanning at least one of a laser beam from a laser and a field of view of a light detector in a scan pattern across the indicia during reading;
   a controller operatively connected to the modules, for preventing reading interference between the modules during reading a mode sensor for detecting whether a mode of operation is a handheld mode or a hands-free mode; and wherein the controller enables the laser scanning module to read the indicia only when the mode sensor detects the handheld mode, and enables only the imaging module to read the indicia when the mode sensor detects the hands-free mode.

2. The reader of claim 1, wherein the housing has a handle to be held by an operator in the handheld mode of operation, and a base for supporting the housing on a support surface during the hands-free mode of operation.

3. The reader of claim 2, wherein the base is connected to the housing in both the handheld and hands-free modes.

4. The reader of claim 3, wherein the base is pivotably connected to the handle.

5. The reader of claim 2, and a manually actuatable trigger on the housing at a location underlying an operator's forefinger when the operator holds the handle in the operator's hand.

6. The reader of claim 1, wherein the controller enables only the laser scanning module to read the indicia when the mode sensor detects the handheld mode, and enables only the imaging module to read the indicia when the mode sensor detects the hands-free mode.

7. The reader of claim 1, wherein the mode sensor is operative for detecting the mode of operation by sensing one of motion, position and orientation of the housing.

8. The reader of claim 1, wherein the housing has a presentation area, and wherein the laser directs the laser beam through the presentation area to the indicia for reflection therefrom, and wherein the imager captures the return light from the indicia through the presentation area.

9. The reader of claim 1, wherein the housing has a gun-shaped configuration.

10. The reader of claim 1, wherein the housing has dual presentation areas, and wherein the laser directs the laser beam through one of the presentation areas to the indicia for reflection therefrom, and wherein the imager captures the return light from the indicia through one of the presentation areas.

11. The reader of claim 1, wherein, when the mode sensor detects the handheld mode, the controller enables the imaging module to capture the return light during an exposure time of a frame, and downloads data generated by the imager during a read-out time of the frame; and wherein the controller enables the laser scanning module to scan the indicia during the read-out time to prevent reading interference with the imaging module.

12. The reader of claim 11, wherein the imaging module includes an illuminator for illuminating the indicia during reading with illumination light directed from an illuminating light source during the exposure time, and wherein the controller disables the illuminating light source during the read-out time to prevent reading interference between the modules.

13. The reader of claim 12, wherein the illumination light and the laser beam have different frequencies to prevent reading interference between the modules.

14. The reader of claim 1, wherein, when the mode sensor detects the handheld mode, the controller turns the laser beam off during scanning; and wherein the controller enables the imaging module to capture the return light when the laser beam is turned off to prevent reading interference with the laser scanning module.

15. The reader of claim 1, wherein, when the mode sensor detects the handheld mode, the housing blocks the laser beam during scanning; and wherein the controller enables the imaging module to capture the return light when the laser beam is blocked to prevent reading interference with the laser scanning module.

16. The reader of claim 1, wherein, when the mode sensor detects the handheld mode, the scanner sweeps through a scan angle larger than a field of view of the imager, and wherein the controller enables the imaging module to capture the return light when the laser beam is outside the field of view of the imager to prevent reading interference between the modules.

17. A reader for electro-optically reading indicia, comprising:

a housing having a handle to be held by an operator in a handheld mode of operation, and a base for supporting the housing on a support surface during a hands-free mode of operation;

an imaging module supported by the housing and including a solid-state imager having an array of image sensors for capturing return light from the indicia during reading;

a laser scanning module supported by the housing and including a scanner for scanning at least one of a laser beam from a laser and a field of view of a light detector in a scan pattern across the indicia during reading;

a mode sensor for detecting the mode of operation; and a controller operatively connected to the modules, for enabling only the laser scanning module to read the indicia when the mode sensor detects the handheld mode, and for enabling only the imaging module to read the indicia when the mode sensor detects the hands-free mode.

18. The reader of claim 17, wherein the mode sensor is operative for detecting the mode of operation by sensing one of motion, position and orientation of the housing.

19. The reader of claim 17, wherein the housing has a presentation area, and wherein the laser directs the laser beam through the presentation area to the indicia for reflection therefrom, and wherein the imager captures the return light from the indicia through the presentation area.

20. The reader of claim 17, wherein the base is connected to the housing in both the handheld and hands-free modes.

21. The reader of claim 17, wherein the base is pivotably connected to the handle.

22. The reader of claim 17, and a manually actuatable trigger on the housing at a location underlying an operator's forefinger when the operator holds the handle in the operator's hand.

23. A method of electro-optically reading indicia, comprising the steps of supporting an imaging module by a housing, and capturing return light from the indicia by the imaging module during reading with a solid-state imager having an array of image sensors;

supporting a laser scanning module by the housing, and scanning at least one of a laser beam from a laser and a field of view of a light detector in a scan pattern across the indicia by the laser scanning module during reading;

preventing reading interference between the modules during reading detecting whether a mode of operation is a handheld mode or a hands-free mode; and enabling the laser scanning module to read the indicia only when the handheld mode is detected, and enabling only the imaging module to read the indicia when the hands-free mode is detected.

24. The method of claim 23, and holding the housing with a handle held by an operator in the handheld mode of operation, and supporting the housing with a base on a support surface during the hands-free mode of operation.

25. The method of claim 24, and connecting the base to the housing in both the handheld and hands-free modes.

26. The method of claim 25, and pivotably connecting the base to the handle.

27. The method of claim 24, and providing a manually actuatable trigger on the housing at a location underlying an operator's forefinger when the operator holds the handle in the operator's hand.

28. The method of claim 23, and enabling only the laser scanning module to read the indicia when the handheld mode is detected, and enabling only the imaging module to read the indicia when the hands-free mode is detected.

29. The method of claim 23, wherein the mode detecting step is performed by sensing one of motion, position and orientation of the housing.

30. The method of claim 23, and configuring the housing with a presentation area, and directing the laser beam through the presentation area to the indicia for reflection therefrom, and capturing the return light from the indicia through the presentation area.

31. The method of claim 23, and configuring the housing with a gun-shaped configuration.

32. The method of claim 23, and configuring the housing with dual presentation areas, and directing the laser beam through one of the presentation areas to the indicia for reflection therefrom, and capturing the return light from the indicia through one of the presentation areas.

33. The method of claim 23, and when the mode sensor detects the handheld mode, enabling the imaging module to capture the return light during an exposure time of a frame, and downloading data generated by the imager during a read-out time of the frame; and enabling the laser scanning module to scan the indicia during the read-out time to prevent reading interference with the imaging module.

34. The method of claim 23, and when the mode sensor detects the handheld mode, enabling the imaging module to illuminate the indicia during reading with illumination light during the exposure time, and disabling the illuminating light during the read-out time to prevent reading interference between the modules.

35. The method of claim 34, and selecting the illumination light and the laser beam to have different frequencies to prevent reading interference between the modules.

36. The method of claim 23, and when the mode sensor detects the handheld mode, turning the laser beam off during scanning; and capturing the return light when the laser beam is turned off to prevent reading interference with the laser scanning module.

37. The method of claim 23, and when the mode sensor detects the handheld mode, blocking the laser beam during scanning; and capturing the return light when the laser beam is blocked to prevent reading interference with the laser scanning module.

38. The method of claim 23, and when the mode sensor detects the handheld mode, sweeping the laser beam through a scan angle larger than a field of view of the imager, and capturing the return light when the laser beam is outside the field of view of the imager to prevent reading interference between the modules.

39. A method of electro-optically reading indicia, comprising the steps of:
holding a housing by a handle held by an operator in a handheld mode of operation, and supporting the housing by a base on a support surface during a hands-free mode of operation;
supporting an imaging module by the housing, and capturing return light from the indicia during reading with a solid-state imager having an array of image sensors;
supporting a laser scanning module by the housing, and scanning at least one of a laser beam from a laser and a field of view of a light detector in a scan pattern across the indicia during reading;
detecting the mode of operation; and
enabling only the laser scanning module to read the indicia when the handheld mode is detected, and enabling only the imaging module to read the indicia when the hands-free mode is detected.

40. The method of claim 39, wherein the detecting step is performed by sensing one of motion, position and orientation of the housing.

41. The method of claim 39, and configuring the housing with a presentation area, and directing the laser beam through the presentation area to the indicia for reflection therefrom, and capturing the return light from the indicia through the presentation area.

42. The method of claim 39, and connecting the base to the housing in both the handheld and hands-free modes.

43. The method of claim 39, and pivotably connecting to the handle.

44. The method of claim 39, and providing a manually actuatable trigger on the housing at a location underlying an operator's forefinger when the operator holds the handle in the operator's hand.

* * * * *